(12) United States Patent
Iwamoto et al.

(10) Patent No.: US 6,645,667 B1
(45) Date of Patent: Nov. 11, 2003

(54) LITHIUM SECONDARY CELL

(75) Inventors: Kazuya Iwamoto, Osaka (JP); Takafumi Oura, Osaka (JP); Shinji Nakanishi, Osaka (JP); Atsushi Ueda, Osaka (JP); Hizuru Koshina, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 238 days.

(21) Appl. No.: 09/807,054

(22) PCT Filed: Jul. 4, 2000

(86) PCT No.: PCT/JP00/04420

§ 371 (c)(1), (2), (4) Date: Jul. 13, 2001

(87) PCT Pub. No.: WO01/11705

PCT Pub. Date: Feb. 15, 2001

(30) Foreign Application Priority Data

Aug. 6, 1999 (JP) ............................. 11-223390

(51) Int. Cl.$^7$ ................................. H01M 6/04
(52) U.S. Cl. ............... 429/126; 429/306; 429/231.1; 429/231.8; 429/231.4; 429/231.95
(58) Field of Search .............. 429/306, 231.1, 429/231.8, 231.4, 126, 231.95

(56) References Cited

U.S. PATENT DOCUMENTS 5,376,475 A 12/1994 Ovshinsky et al.
6,420,071 B1 * 7/2002 Lee et al. ............... 429/300

FOREIGN PATENT DOCUMENTS

| JP | 4-306560 | 10/1992 |
|----|----------|---------|
| JP | 7-82450 | 3/1995 |
| JP | 9-508490 | 8/1997 |
| JP | 10-204172 | 8/1998 |
| JP | 11-126608 | 5/1999 |
| JP | 2000-77073 | 3/2000 |

OTHER PUBLICATIONS

International Search Report corresponding to application No. PCT/JP00/04420 dated Oct. 3, 2000.

English translation of Form PCT/ISA/210.

* cited by examiner

*Primary Examiner*—Laura Weiner
(74) *Attorney, Agent, or Firm*—RatnerPrestia

(57) ABSTRACT

A lithium secondary cell comprising a safe aqueous-solution electrolyte free from danger of firing and explosion and capable of supplying a high voltage of more than 3 V. The cell includes a positive plate having an active material absorbing/desorbing lithium ions and exhibiting a high voltage, a negative plate having an active material exhibiting a low voltage, a polymer solid electrolyte having a lithium-ionic conductivity, and an aqueous-solution electrolyte. The positive and negative plates are coated with a polymer solid electrolyte having an ionic conductivity and therefore isolated from the aqueous-solution electrolyte by the plate coating layers.

6 Claims, 2 Drawing Sheets

US 6,645,667 B1

LITHIUM SECONDARY CELL

This application is a U.S. NATIONAL PHASE APPLICATION OF PCT INTERNATIONAL APPLICATION PCT/JP00/04420.

FIELD OF THE INVENTION

The present invention relates to a secondary battery using an aqueous electrolytic solution containing a lithium salt dissolved therein.

BACKGROUND OF THE INVENTION

Recently, lithium batteries are widely used for main powers of mobile telecommunication gears and portable digital assistants, as batteries with high electromotive force and energy density. In general, these batteries are structured so as to use such compounds as lithium-containing oxides capable of intercalating and de-intercalating lithium ions and exhibiting high electrode potential, e.g. $Li_xCoO_2$ and $Li_xMnO_2$, as their positive electrode active materials, and to use lithium metal or other materials such as graphite and amorphous carbon capable of intercalating and de-intercalating lithium ions and exhibiting low electrode potential like as lithium, as their negative electrode active materials. When these active materials are used in aqueous electrolytic solution, the reaction of lithium and water makes low potential as essential potential of lithium unstable and hinders the active materials from intercalating or de-intercalating lithium ions, and accompanies water electrolysis that makes the voltages lower than that at which the water electrolysis occurs. For these reasons, non-aqueous electrolytes that contain no water in a strict sense are generally used for electrolytic layers.

Various forms are known as these non-aqueous electrolytes. Such forms include: organic electrolytes containing lithium salts dissolved in organic solvents; lithium-ion conductive solid electrolytes; so called "gel" polyelectrolytes containing organic electrolytic solutions held in polymeric matrixes; and dry electrolytes containing lithium dissolved in such organic polymers as polyethylene oxides. As described above, the use of non-aqueous electrolytes inhibits the reaction of lithium and water and makes the electrode reaction caused by lithium intercalation and de-intercalation stable. The use of non-aqueous electrolytes also avoids water electrolysis, and thus a high cell voltage far exceeding 1.2 V of decomposition voltage of water and almost reaching 3 to 4 V can be obtained in a stable manner. On the other hand, however, batteries using these non-aqueous electrolytes have problems related to their properties and safety peculiar to the form of each electrolyte.

Among the various non-aqueous electrolytes shown above, organic electrolytes are most highly used for lithium secondary batteries. Typical organic electrolytes widely used are those containing such lithium salts as lithium hexafluorophosphate and lithium tetrafluoroborate dissolved in such organic solvents as ethylene carbonate, diethyl carbonate, and dimethyl carbonate. In general, these organic solvents are highly voltaic and combustible. For such a reason, batteries using such organic electrolytes have risks that they might be exploded by an increase in their internal pressure or may ignite by catching fire if an abnormal increase in the temperature of the batteries or short-circuit inside of the batteries should be caused by some reasons. In addition, there is another problem. In storage or transportation of combustible or flammable organic solvents and electrolytes and batteries using such solvents, many limitations are imposed on their amount and handling conditions; therefore, their productivity and forms of transportation are restricted.

The above safety problems of combustible organic solvents can be avoided by the use of inorganic solid electrolytes instead that are not voltaic or flammable in themselves, such as $Li_3PO_4$—$Li_2S$—$SiS_2$ and $Li_3N$. In order for these inorganic solid electrolytes to serve as good electrolytes in the form of batteries, the solid electrolytes must be milled, mixed with electrode materials, and molded. Therefore, they have such problems as contactability to active materials and moldability liquid electrolytes never have. The problems arise only because they are solid.

On the other hand, "gel" electrolytes that hold organic electrolytic solutions mixed with such a polar polymeric component as polyacrylonitrile in polymeric matrixes are disclosed, for example, in Japanese Patent Non-Examined Publication Nos. H04-306560 and H07-82450. Such a "gel" electrolyte has immobilized electrolytic solution, which has improved handling apparently. However, since this kind of "gel" polyelectrolytes are the same as organic electrolytic solutions in using organic solvents, problems concerning safety, storage, and transportation essentially have not been solved. In addition, since the polymeric components increase ionic transfer resistance, batteries using "gel" polyelectrolytes tend to be worse than those using organic electrolytic solutions in performance.

As other electrolytes, "dry" polyelectrolytes were developed. They are electrolytes containing lithium salts dissolved in, for example, polyethylene oxide, and an electrolyte as disclosed in Japanese Patent Non-Examined Publication No. H10-204172. This electrolyte has a structure of a cross-linking polymer of a polyether copolymer together with a solute dissolved therein. These "dry" polyelectrolytes, however, have an electric charge transfer mechanism in which mobile cations, i.e. lithium ions, and anions, i.e. counter ions of the lithium ions, transfer at the same time. This mechanism lowers the cation transferenece number, thus posing a problem that transfer of the substances are rate-determining and rapid charge/discharge characteristics are unsatisfactory.

Among these various problems of non-aqueous electrolytes, those concerning safety that may lead to such accidents as explosion, catching fire, and ignition should be addressed first from a practical point of view. In order to avoid these safety problems and improve ionic conductivity as well, the application of aqueous electrolytic solutions that have no risks of catching fire or ignition in them and have excellent ionic conductivity is ideal. Then, some concepts of lithium secondary batteries using conventional aqueous electrolytic solutions were disclosed.

For instance, in Japanese Patent Application Non-Examined Publication No. H09-508490, a lithium secondary battery was disclosed, using a compound that intercalates and de-intercalates lithium ions and exhibits an electrode potential higher than that of lithium, such as $LiMn_2O_4$, or $VO_2$ for its positive electrode active materials, and a compound that intercalates and de-intercalates lithium ions and exhibits an electrode potential similar to that of lithium, for its negative electrode active materials, and an alkali aqueous electrolytic solution containing a lithium salt such as LiCl and LiOH dissolved in water.

Moreover, released in a newspaper on Jun. 9, 1999, was a lithium secondary battery using, $LiCoO_2$, $LiNiO_2$, $LiMn_2O_4$, or $LiV_2O_5$ for its positive electrode active materials, and a vanadium compound such as $LiVO_2$, $LiV_3O_8$, or iron compound such as γ-FeOOH for its negative electrode active materials, and a neutral aqueous electrolytic solution containing lithium sulfate or lithium chloride dissolved in water as its electrolytic solution.

However, according to the disclosure, each of these types of batteries was only structured to use an aqueous electrolytic solution in place of a non-aqueous electrolyte in the conventional lithium secondary batteries using non-aqueous electrolytes, and had operating voltages from 1 to 2 V. In reality, the stable operating voltage range was approximately 1.2 V and these aqueous electrolyte batteries essentially did not exceed the concept of those conventional batteries using aqueous electrolytes. Therefore, it had been considered that the batteries using aqueous electrolytic solutions were not capable of attaining such a high electromotive force attainable with lithium batteries using non-aqueous electrolytes.

The present invention intends to realize a lithium secondary battery that has an aqueous electrolytic solution but exhibits high electromotive force attainable with a non-aqueous electrolyte secondary battery by paying attention to the following two points. The high cell voltage of a lithium secondary battery is obtained by an environment of a material intercalating and de-intercalating lithium ions and an ion-conductive electrolyte without existence of water; and water electrolysis in the aqueous electrolytic solution is caused by the transfer of electrons between the electron-conductive electrodes and water molecules in contact therewith. Moreover, the present invention also intends to realize a lithium secondary battery having a high level of safety in which no internal short-circuit is caused by dendrite growth, utilizing a feature of no electrical deposit of metal lithium in aqueous electrolytic solutions.

SUMMARY OF THE INVENTION

In the present invention, disclosed is a lithium secondary battery having, as its basic structure to achieve the above purposes, positive and negative electrodes having active substances capable of intercalating and de-intercalating lithium ions; electrode coating layers made of a water insoluble ion-conductive polymeric solid electrolyte covering the both electrodes; and an aqueous electrolytic solution that exists between the electrode coating layers on the above both electrodes and is separated from the positive and negative electrodes.

In the structure of the present invention, like non-aqueous electrolyte batteries, reversible electric potential is generated by intercalation and de-intercalation of lithium ions from the positive and negative electrodes coated with the non-aqueous polymeric solid electrolyte. The aqueous electrolytic solution exists between the polymeric solid electrolytic layers covering each of the positive and negative electrodes, and is only assigned for ionic conductivity of lithium ions. Because each of the above positive and negative electrodes is separated by the non-aqueous electrolyte lithium from the aqueous electrolytic solution, no electrons are transferred between water molecules and the electrode plates. Therefore, no electrolysis will occur even if an electric potential higher than that of water electrolysis is generated between the positive and negative electrodes. This structure has enabled the accomplishment of a lithium secondary battery having safety and a cell voltage exceeding 3 V that had been considered attainable only with conventional non-aqueous electrolytes even though the battery uses an aqueous electrolytic solution.

PREFERRED EMBODIMENTS OF THE INVENTION

An exemplary embodiment of the present invention related to its basic structural components is demonstrated hereinafter with reference to the accompanying drawings.

Figure 1:
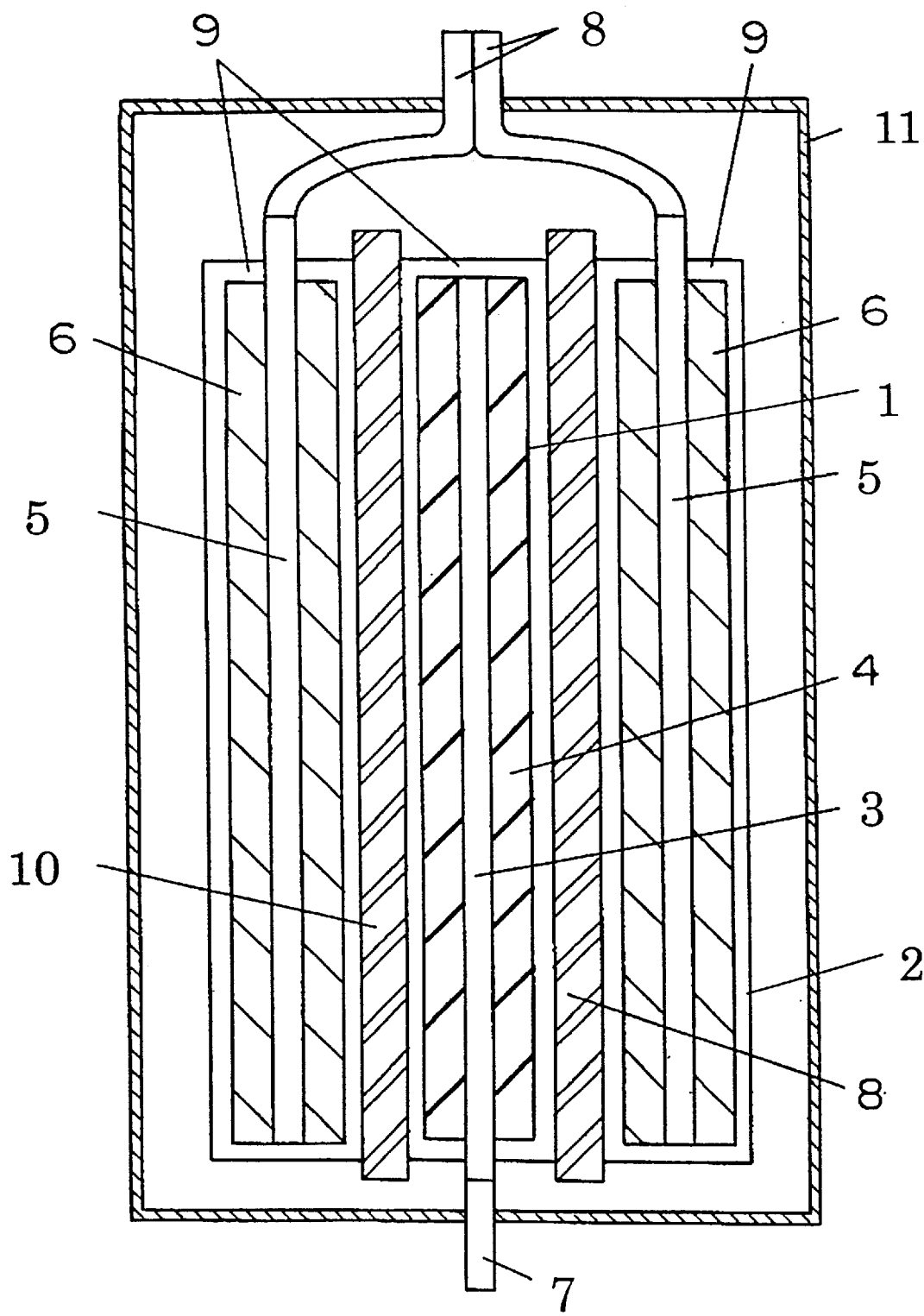
FIG. 1 is a cross sectional view of a lithium secondary battery in accordance with an exemplary embodiment of the present invention.

FIG. 1 shows a lithium secondary battery in accordance with the present invention. Reference numeral 1 shows a positive electrode, 2 negative electrodes, 3 a positive electrode current collector, 4 a positive electrode active material layer, 5 negative electrode current collectors, 6 negative electrode active material layers, 7 a positive electrode lead, 8 negative electrode leads, 9 electrode coating layers, 10 separators, and 11 a package.

Positive electrode 1 is composed of positive electrode current collector 3 and positive electrode active substance layer 4 carried thereby. Similarly, negative electrodes 2 are composed of negative electrode current collectors 5 and positive electrode active substance layers 6 carried thereby. Connected to positive electrode current collector 3 and negative electrode current collectors 5, respectively, are positive electrode lead 7 and negative electrode leads 8. On each of the above positive electrode 1 and negative electrodes 2, electrode coating layers 9 are formed by a non-aqueous polymeric solid electrolyte that is not electron-conductive but ion-conductive. The positive and negative electrodes having electrode coating layers 9 are combined via the separators to form a group of electrodes and all of them are housed in aluminum-laminated package 11. Positive electrode lead 7 and negative electrode leads 8, grouped by polarity, pass through package 11, and are electrically insulated from package 11. An aqueous electrolytic solution (not shown) fills the inside of the package and most of the solution is impregnated into separators 10.

Now, the surfaces of positive electrode lead 7 and negative electrode leads 8 exposed from electrode coating layers 9 inside of package 11 must completely be separated from aqueous electrolytic solution. Though not shown in the drawing, such desirable methods include: coating the surfaces of the current collectors or leads exposed in the cell with insulating resin; coating with resin the periphery surfaces of the separators that does not face to the coating layers; and forming aqueous electrolytic layers immobilized with insulting powder or gelling agent instead of the separators. Desirably, these methods are used in combination.

In the structure of the present invention, positive electrode 1 and negative electrodes 2 are separated from aqueous electrolytic solution impregnated into separators 10 by a non-aqueous polymeric solid electrolyte that is not electron-conductive but ion-conductive. Therefore, positive electrode 1 and negative electrodes 2 placed in an environment of the ion-conductive non-aqueous polymeric solid electrolyte are capable of intercalating and de-intercalating of lithium ions, like a conventional non-aqueous lithium secondary battery. Thus, these electrodes and the polymeric solid-like electrolyte are assigned solely to generate electromotive force.

On the other hand, in order to advance the function of the battery, ionic conduction caused by ion transfer between two electrodes is necessary. This ionic conduction is sequentially performed by the polymeric solid electrolyte that coats positive electrode 1 and negative electrodes 2, respectively, and the aqueous electrolytic solution interposed between the solid-like electrolyte layers and separated from the electrodes. In other words, in the structure of the present invention, the aqueous electrolytic solution is assigned solely to transfer charges via ions.

Next, an exemplary embodiment of the major components of the lithium secondary battery structured as above is described.

First, the positive and negative electrodes are surrounded by a non-aqueous polymeric solid electrolyte, and moreover, an aqueous electrolytic solution exists as it is separated by the above polymeric solid electrolyte from the electrodes. It is necessary to know active materials that can intercalate and de-intercalate lithium ions, and exhibit an electrode potential higher than that of lithium at the positive electrode or a low electrode potential similar to that of lithium at the negative electrode in a stable manner in such a specified environment. Studies on various compounds have revealed that positive and negative electrode materials used for ordinary non-aqueous electrolyte lithium secondary batteries, such as spinel-type lithium-containing metal oxides, etc., were applicable.

Especially preferable positive electrode active substances are compounds containing at least one component selected from the group consisting of $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (M is at least one of Na, Mg, Sc, Y, Mn, Fe, Co, Ni, Cu, Zn, Al, Cr, Pb, Sb and B, and x=0 to 1.2, Y=0 to 0.9, z=2.0 to 2.3). The above x value is a value before charge/discharge is started, that is, it shows composition and lithium proportion of the material when the mixture is prepared, and thus it changes along with intercalation and de-intercalation of lithium ions in the charge/discharge process.

Usable positive electrode substances other than these cobalt and manganese oxides include transition metal chalcogenides, a vanadium oxide and its lithium compounds, a niobium oxide and its lithium compounds, a conjugate polymer using organic conductive materials, and Chevril's phase compounds. It is also possible to use a plurality of different positive electrode active materials in combination. The average diameter of particles of the positive electrode active substances is not specifically defined; however, preferably it is 1 to 30 $\mu$m.

Preferable and applicable negative electrode active substances other than metal lithium include a single substance or compound containing at least one selected from the group consisting of: pyrolytic carbons capable of intercalating and de-intercalating lithium; such cokes as pitch cokes, needle cokes, and petroleum cokes; graphite materials; glassy carbons; fired organic polymeric compounds obtained by firing and carbonizing phenol or furan resins at proper temperatures; such carbon materials as carbon fibers and active carbons; polymers such as polyacetylene, polypyrrole and polyacene; and lithium-containing transition metal oxides or transition metal sulfates, such as $Li_{4/3}Ti_{5/3}O_4$ and $TiS_2$.

Among these substances, carbon materials are most suitable. For example, the use of graphite of which lattice spacing (002) is 0.340 nm or shorter provides high energy density. The above materials can be used in combination.

The above positive and negative electrode active substances are kneaded with conductive materials and binders to form active substamce mixtures, and are applied to and charged on positive electrode current collector 3 and negative electrode current collectors 5.

For conductive materials for the positive electrode mixtures, any electron-conductive material is widely applicable on condition that it does not chemically change within the range of charge and discharge potentials of the positive electrode materials in use. Examples of such materials include: graphite materials including natural graphite (scale-like graphite) and artificial graphite; carbon black materials such as acetylene black, Ketzen black, channel black, furnace black, lamp black and thermal black; conductive fibers such as carbon fibers and metallic fibers; fluorinated carbon; metal powders such as, copper, nickel, aluminum, and silver; conductive whiskers such as a zinc oxide and potassium titanate; conductive metal oxides such as a titanium oxide; and organic conductive materials such as polyphenylene derivatives. These substances can be used independently or in combination. Among these conductive materials, artificial graphite, acetylene black, and nickel powder are especially preferable.

The amount of the above conductive materials to be added is not specifically defined; however, 1 to 50 weight percent is preferable. In order to make the capacity and characteristics balanced, especially 1 to 30 weight percent is preferable. For carbon and graphite, 2 to 15 weight percent is appropriate.

As conductive materials for the negative electrode mixture, electron-conductive materials are widely applicable. Examples of such materials include: graphite materials such as natural graphite (scale-like graphite) and artificial graphite; carbon black materials such as acetylene black, Ketzen black, channel black, furnace black, lamp black and thermal black; conductive fibers such as carbon fibers and metal fibers; fluorinated carbon; metal powders such as, copper and nickel; and organic conductive materials such as polyphenylene derivatives. These materials can be used independently or in combination. Among these conductive materials, artificial graphite, acetylene black, and carbon fibers are especially preferable.

The amount of the above conductive materials to be added is not specifically defined; however, 1 to 50 weight percent is preferable. In order to satisfy both the capacities calculated by charged active substances and characteristics, 1 to 30 weight percent is especially preferable. Because carbons have electron conductivity in themselves, negative electrode substance layers 6 of the present invention can work as negative electrodes without any additional conductive materials.

Each of the negative and positive electrode mixtures can contain a binder, filler, dispersant, ion conductor, and other various additives as required, other than the above conductive material.

Fillers are reinforcements, and any material that does not chemically change in the constructed battery can be used in the form of fibers. Generally, such olefinic polymers as polypropylene and polyethylene, and such fibers as glass and carbon are used. The amount of the filler to be added is not specifically defined; however, 0 to 30 weight percent is preferable.

The ion-conductive material can be the same polymeric solid electrolyte for forming electrode-coating layers; however, other non-aqueous ion-conductive materials can be used.

The mixture of the above various materials are suitable to be kneaded with water or organic solvents and used as paste. The active material mixtures are charged on positive electrode current collector 3 or negative electrode current collectors 5, respectively, in an usual manner, and dried to form active material layer 4 of positive electrode 1 and active material layers 6 of negative electrodes 2.

For positive electrode current collector 3, any electron-conductive material can be used on condition that it does not chemically change at the charge and discharge electrode potentials of the positive electrode material in use. Examples of such materials include aluminum or stainless steel surface-treated with carbon or titanium as well as stainless steel, aluminum, titanium, carbon, and conductive resin. Among these, aluminum and aluminum alloys are light and highly electron-conductive; thus they are preferable materials.

These materials can also be used after their surfaces have been oxidized. Those treated to have asperities on their surfaces are also a preferable form. The shapes of the current collector include a film, sheet, net, punched metal, lath, porous body, foam, grouped fibers, and a formed non-woven cloth as well as a foil. The thickness is not specifically defined; however, collectors 1 to 5 μm thick are preferable.

Next, the materials of electrode coating layers 9, one of the major components of the present invention, are described. Naturally, it is necessary that the materials of electrode coating layers 9 should not be water-soluble or electron-conductive, or should not be dissolved in or react with aqueous electrolytic solution. Basic requirements of the coating materials are as follows: they are non-aqueous and lithium-ion conductive; and they can provide an environment where the active materials of the positive and negative electrodes can intercalate and de-intercalate lithium ions. Preferable materials that can satisfy the above requirements include an ion-conductive polymer containing a lithium salt dissolved in a polymer selected from a group consisting of: polyester, polyamine, polysulfide, polyether copolymers, polyether cross-linking bodies, and comb shaped polymers having polyether side chains.

Among the substances, ionic conductive polymeric solid electrolytes having lithium salt on those side chains of polymer substsnces, and mixture of compounds having carbon-carbon double bonds and the lithiumsilylamido compounds. The applicable lithiumsilylamido compounds include lithium bis trimethylsilylamide and lithium bis triethylsilylamide.

The compounds having carbon-carbon double bonds include methacrylonitrile, acrylonitrile, acrylic acid, methacrylic acid, maleic acid, itaconic acid, vinyl propionic acid, methyl acrylate, ethyl acrylate, normal propyl acrylate, isopropyl acrylate, normal butyl acrylate, methyl methacrylate, ethyl methacrylate, hydroxylethyl metacrylate, vinyl formate, vinyl acetate, butadiene, vinylene carbonate, vinyl ethylene carbonate, and divinyl ethylene carbonate. Any other compound having carbon-carbon double bonds can be used by separate polymerization.

The above electrode coating materials can be used by mixing with water-repellent binders and organic solvents, as required. Preferably, the above materials are applied to the surfaces of positive electrode 1 and negative electrodes 2 to form electrode-coating layers 9. Since the function of the battery of the present invention is performed on condition that positive electrode 1 and negative electrodes 2 are not in contact with the aqueous electrolytic solution, the entire electrodes should not be coated necessarily if the battery is structured to have the aqueous electrolytic solution impregnated into separators and completely retained therein without seeping out. Providing electrode coating layers 9 only on the surfaces of positive electrode 1 and negative electrodes 2 facing to the separators to separate the electrodes from the aqueous electrolytic solution has the same function as shown here and this form is included in the present invention.

Next, aqueous electrolytic solutions are described. The aqueous electrolytic solutions are prepared by dissolving lithium salts in water. As the requirements of lithium salts, they should be water-soluble and highly conductive and should not react with the material of electrode coating layers 9. The lithium salts to be dissolved in water include: bis [trifluoromethane sulfonate]imido lithium $(CF_3SO_2)_2NLi$, bis [pentafluoroethane sulfonate]imido lithium $(C_2F_5SO_2)_2NLi$, bis [1,2 benzendiolate(2-)-O,O']lithium borate, bis [2,3 naphtalenediolate(2-)-O,O']lithium borate, bis [2,2' biphenyldiolate(2-)-O,O']lithium borate, bis [5 fluoro-diolate-1 benzene sulfonate (2-)-O,O']lithium borate, lithium hexafluorophosphate ($LiPF_6$), lithium hexafluoroantimonate ($LiSbF_6$), lithium hexafluoroarsenate ($LiAsF_6$), lithium tetrafluoroborate ($LiBF_4$), lithium perchlorate ($LiClO_4$), lithium chloride (LiCl), lithium bromide (LiBr), lithium hydroxide (LiOH), lithium nitrate ($LiNO_3$), and lithium sulfide ($Li_2SO_4$).

The group of electrodes is configured so that porous separators are placed between positive electrode 1 and negative electrodes 2, all of which are inserted into package 11. An aqueous electrolytic solution is provided into package 11. The forms of providing the aqueous electrolytic solution include: pouring the solution after the group of electrodes is inserted into package 11 as mentioned above; impregnating the solution into porous separators 10; and kneading the solution with gelling agent and placing the mixture between electrode coating layers 9 on the both electrodes in place of separator layers 10. Any of these forms can be used independently or in combination.

The positive electrode current collector and the lead are connected, and the exposed parts are insulated at any time before the electrodes are inserted into the package.

For package 11, light resin materials such as polypropylene, ABS, polyethylene, and epoxy resin, can widely be used. Laminated metals such as aluminum and titanium can be used as required.

After the battery has been constructed as above, the package is temporarily sealed. After being subjected to necessary steps such as initial charging and inspection, the package is sealed again.

As described above, the lithium secondary battery of the present invention is characterized by having: positive and negative electrodes having active materials capable of intercalating and de-intercalating lithium ions; electrode coating layers made of a water insoluble ion-conductive polymeric solid electrolyte and covering the both electrodes,; and an aqueous electrolytic solution that exists between the electrode coating layers on the above both electrodes. Although this lithium secondary battery has an aqueous electrolytic solution, it has excellent safety and provides a high battery voltage similar to that attainable with conventional secondary batteries using non-aqueous electrolytes.

Next, the function of the battery in accordance with the present invention is described with reference to examples.

EXAMPLE 1

The positive electrode plate was made by the steps of: mixing 85 weight percent of lithium cobalt dioxide powder as a positive electrode active substance, 10 weight percent of carbon powder as a conductive agent, and 5 weight percent of polyvinylidene fluoride resin as a binder; dispersing this mixture with dehydrated N-methylpyrrolidinone to prepare a positive electrode mixture in the form of slurry; and applying the slurry to an aluminum foil used as positive electrode current collector 3, drying, and then rolling it.

On the other hand, the negative electrode plates were made by the steps of: mixing 75 weight percent of artificial graphite powder as negative electrode active substances, 20 weight percent of carbon powder as a conductive agent, and 5 weight percent of polyvinylidene fluoride resin as a binder; dispersing this mixture with dehydrated N-methylpyrrolidinone to prepare a negative electrode mixture in the form of slurry; and applying the slurry to copper foils used as the negative electrode current collectors, drying, and then rolling them.

The polymeric solid electrolyte for coating the electrodes were prepared by mixing and stirring 2.002 g of ethyl acrylate with a molecular weight of 100.117 and 3.3466 g of lithium bis trimethylsilylamido with a molecular weight of 166.330 for 30 minutes in a dry atmosphere with a dew point of −30° or below. Next, the above ion-conductive polymeric solid electrolyte was applied to the surfaces of the positive and negative electrodes using the doctor blade method and polymerized under a dry air current to form electrode coating layers.

Next, leads were connected to the current collectors of the above electrode plates, the exposed surfaces of the current collectors and leads were coated and insulated with epoxy resin. Then, one positive electrode and two negative electrodes coated with the above polymeric solid electrolyte were placed opposite with each other via polyethylene separators and housed into a polyethylene package laminated with aluminum with the positive and negative electrode leads protruding from the package.

For the aqueous electrolytic solution, 1.25 M of bis tripentafluoroethane sulfonate imido lithium solution was prepared and poured into the above package. The aluminum-laminated package was heat-sealed and the lithium secondary battery with a design capacity of 120 mAh in accordance with the present invention was produced.

EXAMPLE 2

A lithium secondary battery was produced according to the procedure shown in Example 1 except that an ion-conductive polymeric solid electrolyte substance containing lithium tetrafluoroborate dissolved in a polyester and represented by a chemical formula $[O(CH_2)(CH_2)OCO(CH_2)_mCO]_n$ (m and n: positive integer) was used for the electrode coating layer, and 1.5 M of lithium tetrafluoroborate solution for the aqueous electrolytic solution.

Next, in order to clarify the function of the lithium secondary battery of the present invention, charge/discharge tests were performed on these produced batteries at a current of 12 mA, the equivalent of 0.1 C of the designed capacity of 120 mAh. The charge completion voltage was determined as 4.1 V and the discharge completion voltage as 3.0V.

Figure 2:
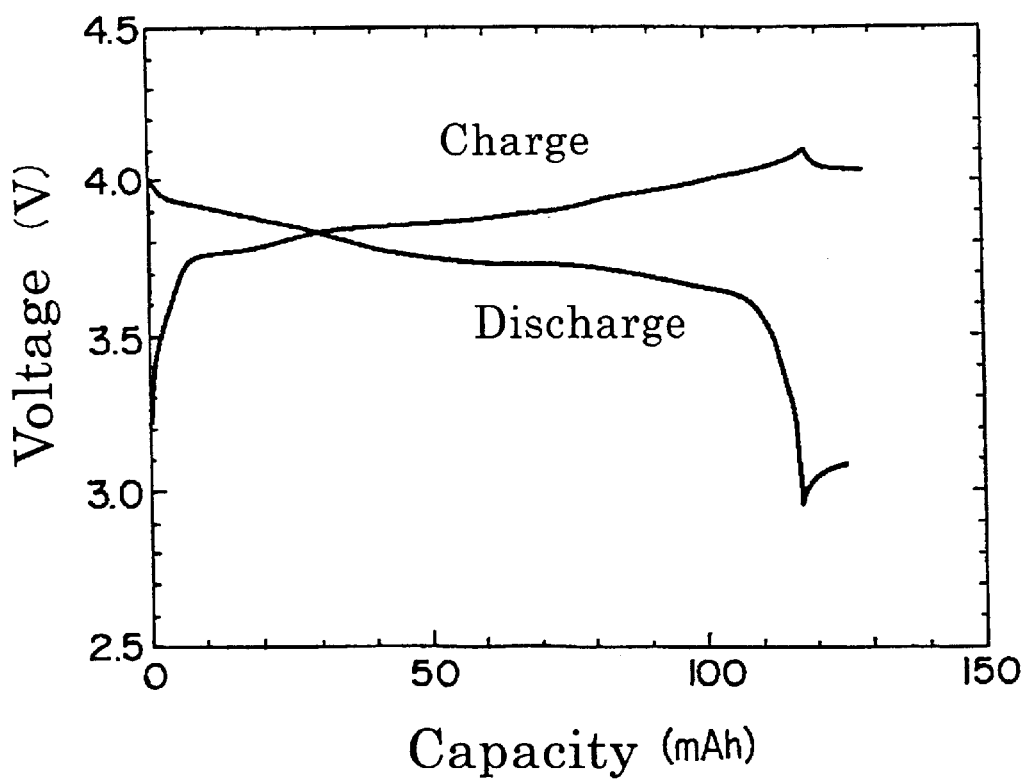
FIG. 2 shows charge and discharge curves of the lithium secondary battery in accordance with the present invention.

The changes in the charge and discharge voltages are shown in FIG. 2. Since the batteries of the above two Examples exhibited almost the same characteristics, only the characteristics of Example 1 are shown in the chart as a typical example.

As best seen in the chart, the lithium secondary batteries of the present invention exhibited a high discharge voltage exceeding 3 V in a stable manner even though they use aqueous electrolytic solutions. Moreover, using aqueous electrolytic solutions having considerably smaller ionic transfer resistance than conventional non-aqueous electrolytes, these batteries of the present invention exhibited more excellent voltage characteristics than non-aqueous electrolyte lithium secondary batteries. As theoretically calculated from the weight of the active substances, a capacity of about 120 mAh proved to be obtained.

Ion-conductive polymeric solid electrolytes shown in these Examples are: a polymer made of ethyl acrylate and lithium bis trimethylsilylamide; and a polymer made of a polyester polymer represented by a chemical formula $[O(CH_2)(CH_2)OCO(CH_2)_mCO]_n$ as its structure, and lithium tetrafluoroborate mixed therein. However, the present invention is not limited to the above Examples. Any other water insoluble ion-conductive polymeric solid electrolyte can be used and its composition can be selected arbitrarily.

The materials of positive electrode active materials, negative electrode active materials, electrode coating layers, and aqueous electrolytic solutions, all of which are major components of the present invention, are not limited to those described in the above Examples, and various combinations already given as the preferred embodiments can be used. In addition, as for the structure of lithium secondary batteries of the present invention, any form can be used on condition that the battery has a basic structure in which the electrodes are in contact with the polymeric solid electrolyte but separated from the aqueous electrolytic solution by the polymeric solid electrolyte. The forms are not limited to those shown in the above Examples.

Any form of the batteries can be selected from a coin, button, sheet, lamination, cylinder, flat, square as well as a package shown in these Examples.

INDUSTRIAL APPLICABILITY

As described above, by using a safe aqueous electrolytic solution, the lithium secondary battery of the present invention can attain a high voltage and excellent charge/discharge characteristics comparable to those of conventional non-aqueous lithium secondary batteries. The battery of the present invention can widely be utilized for driving power sources of electric vehicles, hybrid cars, motor bicycles, and the like, and other various power sources of small household power storage devices, personal digital assistants, mobile electronic gears, and the like.

What is claimed is:

1. A lithium secondary battery comprising:

a positive electrode and negative electrodes having active substances capable of intercalating and de-intercalating lithium ions;

electrode coating layers made of a water insoluble ion-conductive polymeric solid electrolyte and covering said both electrodes; and an aqueous electrolytic solution existing between said electroed-coating layers on said both electrodes.

2. The lithium secondary battery as defined in claim 1 wherein said polymeric solid electrolyte is an ion-conductive polymer containing a lithium salt dissolved in at least one kind of polymers selected from a group consisting of: polyester, polyamine, polysulfide, polyether copolymers, polyether cross-linking bodies, and comb shaped polymers having polyether side chains.

3. The lithium secondary battery as defined in claim 1 wherein said polymeric solid electrolyte is an ion-conductive material having lithium salts as polymer side chains.

4. The lithium secondary battery as defined in claim 1 wherein said polymeric solid electrolyte is a mixture of a compound having carbon-carbon double bonds and a lithium silylamide compound.

5. The lithium secondary battery as defined in claim 1 wherein said positive electrode contains at least one component selected from a group consisting of: $Li_xCoO_2$, $Li_xNiO_2$, $Li_xMnO_2$, $Co_yNi_{1-y}O_2$, $Li_xCo_yM_{1-y}O_2$, $Li_xNi_{1-y}M_yO_2$, $Li_xMn_2O_2$, and $Li_xMn_{2-y}M_yO_2$ (M is at least one of Na, Mg, Sc, Y, Mn, Fe, Co, Ni, Cu, Zn, Al, Cr, Pb, Sb and B, and x=0 to 1.2, Y=0 to 0.9, z=2.0 to 2.3).

6. The lithium secondary battery as defined in claim 1 wherein said negative electrode contains at least one component selected from a group consisting of: metal lithium; pyrolytic carbons capable of intercalating and de-intercalating lithium; cokes; graphite materials; glassy carbons; fired organic polymeric compounds; carbon fibers; active carbons; such polymers as polyacetylene, polypyrrole and polyacene; and one of lithium-containing transition metal oxides and transition metal sulfates, such as $Li_{4/3}Ti_{5/3}O_4$ and $TiS_2$.

* * * * *